April 16, 1963     L. H. MORIN     3,085,451
VARIABLE COMPOUND SPEED REDUCER
Filed Dec. 20, 1961
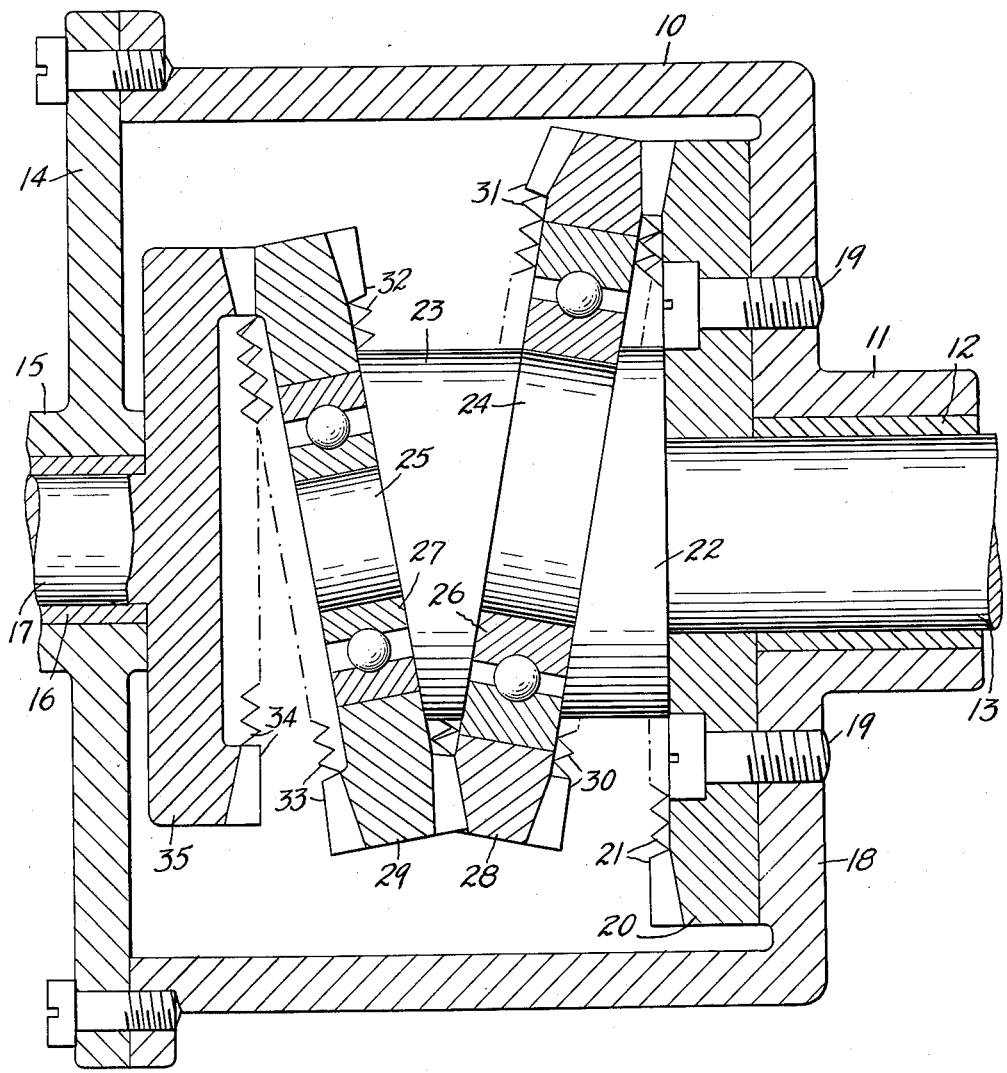
INVENTOR.
LOUIS H. MORIN
BY
Howard E. Thompson
ATTORNEY _United States Patent Office_

3,085,451
Patented Apr. 16, 1963

3,085,451
VARIABLE COMPOUND SPEED REDUCER
Louis H. Morin, Bronx, N.Y.
(125 Beechwood Ave., New Rochelle, N.Y.)
Filed Dec. 20, 1961, Ser. No. 160,711
5 Claims. (Cl. 74—800)

This invention relates to speed reducers, wherein a high speed drive or power shaft can actuate an output or driven shaft at extremely high reductions as and when reduced drives of this type and kind are desirable. More particularly, the invention deals with a reducer of a compound type, wherein most any desired ratio can be arrived at.

Still more particularly, the invention deals with a reducer of the character described, wherein the drive shaft has two independent skew axles, upon which independent two-faced gears are arranged.

The novel features of the invention will be best understood from the following description, when taken together with the accompanying drawing, in which certain embodiments of the invention are disclosed and in which the separate parts are designated by suitable reference characters.

The drawing is a longitudinal sectional schematic view of a reducer made according to my invention, with parts of the construction shown in elevation and illustrating only part of the teeth of the several gears employed.

In diagrammatically or schematically illustrating one adaptation and use of my invention, I have shown at 10 a casing having a bearing portion 11 centrally of one side thereof supporting a bearing 12, in which a drive or input shaft 13 is arranged. The opposed side of the casing is opened and closed by a cover 14, having a bearing portion 15, in which a suitable bearing 16 is arranged for support of the output or driven shaft 17.

Fixed to the end wall 18 of the casing, as by screws 19, is a stationary gear 20, having circumferentially spaced teeth illustrated, in part, at 21. At this time, it is pointed out that the teeth of this gear, as well as other gears later described, are preferably of the triangular type, which is advantageous in enabling more teeth to be formed in the gears in producing higher ratios.

The shaft 13 has what might be termed spaced hubs 22 and 23 of greater diameter than the shaft 13. Between the hubs 22 and 23 is one skew axle 24, the axis of which is angular to the axis of the shaft 13. Another axle 25 is arranged outwardly of the hub 23 and has an axis angularly to the axis of the shaft 13 and the axis of the axle 24. Arranged on the axles 24 and 25 are ball bearings 26 and 27, respectively, to the outer races of which are secured double-faced gears 28 and 29, respectively, the gear 28 having teeth 30 circumferentially of one surface which mesh with the teeth 21 and teeth 31 on the opposed surface, which mesh with teeth 32 on one surface of the gear 29. The other surface of the gear 29 has teeth 33 which mesh with teeth 34 on a gear 35 actuating the shaft 17. In the present illustration, the gear 35 is shown as being integral with the shaft 17.

In producing a desired speed reduction, a predetermined arrangement of teeth between the respective gears will be provided and, in illustrating one adaptation and use, the gear 20 may have one tooth 21 more than the teeth 30 on the gear 28. The gear 28 may have one tooth 31 more than the teeth 32 on the gear 29. Still further, the gear 29 may have one tooth 33 more than the teeth 34 on the gear 35.

It will be understood that the respective gears employed can be of varied diameters in calculating different ratios and, in like manner, the skew or angularity of the axles 24 and 25 with respect to each other and to the shaft 13 can be varied, the only essential thing being to at all times maintain constant engagement of the gears 28 and 29 with the gears 20, 35, respectively, and to each other.

It will be apparent that, in the construction shown, the axle 24 is of greater diameter than the axle 25. For purposes of description, the gears 28 and 29 may be said to comprise a pair of skew actuated double-faced gears.

Having fully described my invention, what I claim as new and desire to secure by Letters Patent is:

1. A speed reducer of the character described comprising a casing, a drive shaft rotatably mounted in one end of the casing, a driven shaft rotatably mounted in the other end of said casing, a gear arranged in and fixed to the first named end of the casing, a gear for actuating said driven shaft, said drive shaft having two skew axles spaced longitudinally thereof within said casing, a pair of double-faced gears freely rotatable on said skew axles, adjacent surfaces of said pair of gears having teeth in constant mesh, the opposed surface of one of said pair of gears having a gear surface in constant mesh with said first named fixed gear, the opposed surface of the other gear in said pair having a gear surface in constant mesh with the gear actuating said driven shaft, the number of teeth on said opposed surfaces of said pairs of gears varying with respect to the number of teeth on the fixed gear and driven gear, and the number of teeth on adjacent engaged surfaces of said pair of gears varying one with respect to the other.

2. A speed reduced as defined in claim 1, wherein the axes of said skew axles are angular to each other.

3. A speed reduced as defined in claim 2, wherein said skew axles are spaced by an intermediate hub portion on said drive shaft.

4. A speed reducer as defined in claim 1, wherein said pair of gears have ball bearing mountings on said skew axles.

5. A speed reducer as defined in claim 4, wherein said skew axles are of different diameters.

References Cited in the file of this patent
UNITED STATES PATENTS

| | | |
|---|---|---|
| 367,293 | Hanser | July 26, 1887 |
| 2,699,690 | Kobler | Jan. 18, 1955 |